J. T. SWEET.
Improvement in Balance Valves for Steam Engines.
No. 119,427. Patented Sep. 26, 1871.
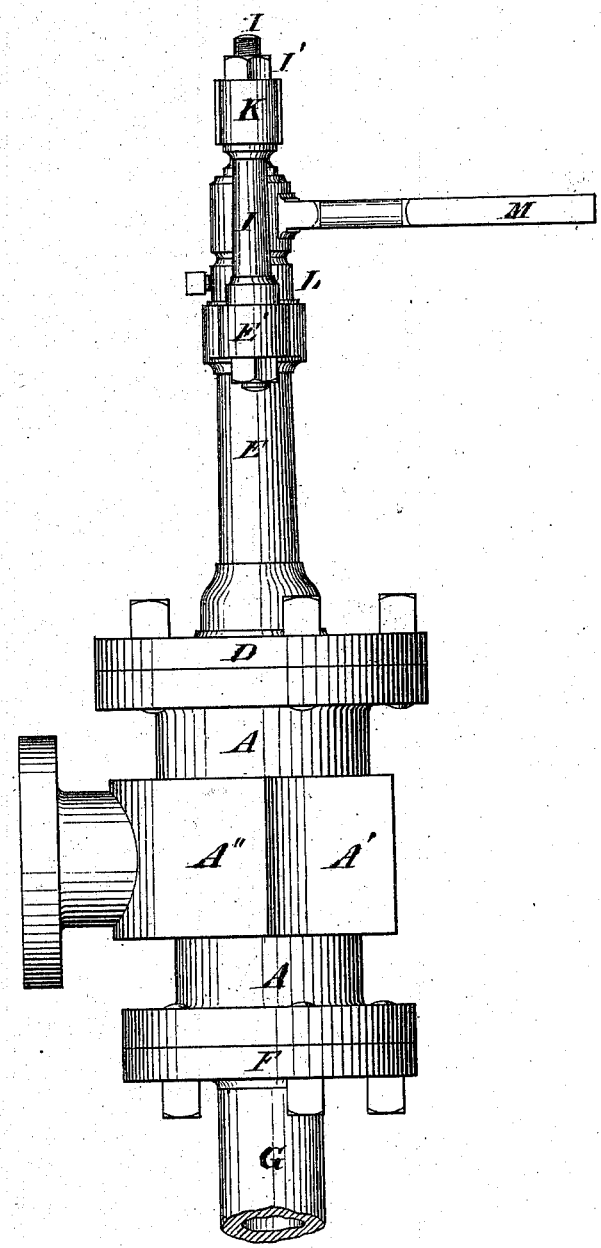
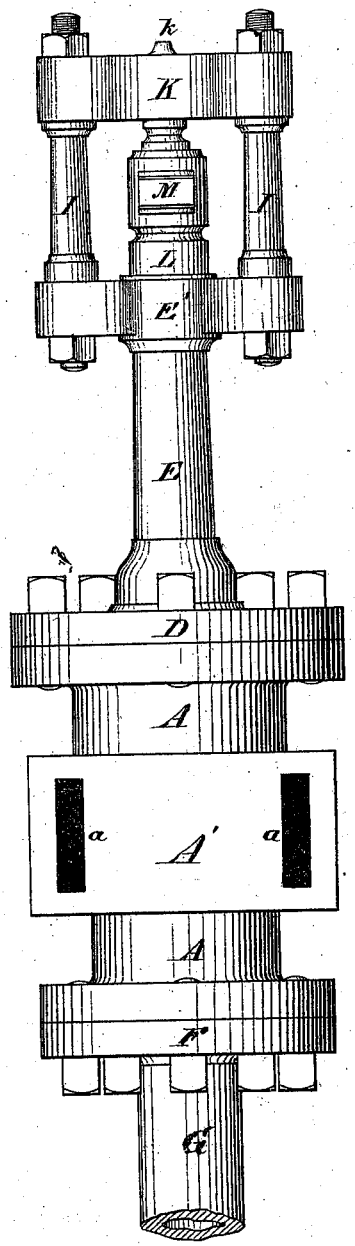
Witnesses:
T. C. Brecht.
John R. Young.
Inventor:
J. T. Sweet, by
Prindle and Dyer,
his Attys.

[98.]

2 Sheets--Sheet 2.

J. T. SWEET.

Improvement in Balance Valves for Steam Engines.

No. 119,427.　　　　　　　　　　　Patented Sep. 26, 1871.

Witnesses:
T. C. Brecht.
John R. Young

Inventor:
J. T. Sweet, by
Prindle and Dyer,
his Attys.

UNITED STATES PATENT OFFICE.

JOHN F. SWEET, OF CEDAR RAPIDS, IOWA.

IMPROVEMENT IN BALANCED VALVES FOR STEAM-ENGINES.

Specification forming part of Letters Patent No. 119,427, dated September 26, 1871.

*To all whom it may concern:*

Be it known that I, JOHN F. SWEET, of Cedar Rapids, in the county of Linn and in the State of Iowa, have invented certain new and useful Improvements in Balanced Valves; and do hereby declare that the following is a full, clear, and exact description thereof, reference being had to the accompanying drawing making a part of this specification, in which—

Figure 3:
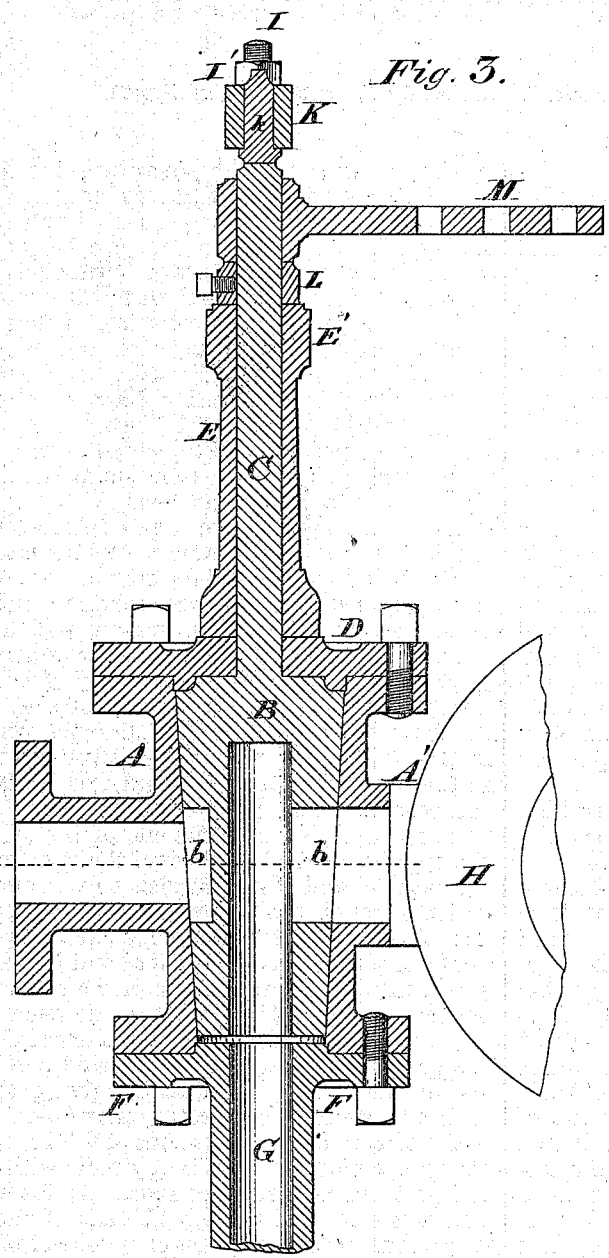
Figure 4:
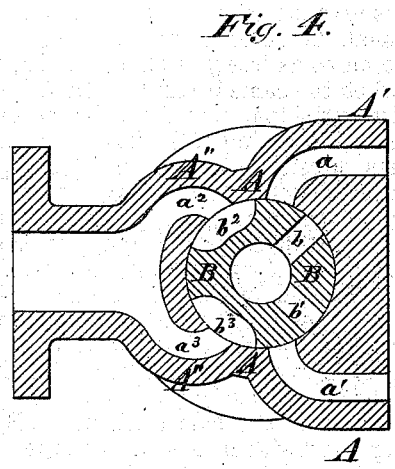

Figure 1 is a side elevation of my device. Fig. 2 is a plan view of its upper side. Fig. 3 is a longitudinal central section of the same on the line $x\ x$ of Fig. 2, and Fig. 4 is a central cross-section of said device on the line $z\ z$ of Fig. 3.

The object of my invention is the production of a valve for use in admitting steam to and permitting the same to escape from a cylinder, upon the sides and end of which the pressure of said steam shall be so equalized as to enable said valve to move as freely when under such pressure as when the same is removed therefrom; and it consists, principally, in the arrangement within the plug and casing of the induction and eduction-ports, substantially as and for the purpose hereinafter shown. It consists, further, in the means employed for adjusting to and controlling in longitudinal position the plug, substantially as and for the purpose hereinafter set forth.

In the annexed drawing, A represents the casing, having, preferably, a general cylindrical form exteriorly, through the center of which is formed a round tapering opening that decreases regularly in size from one end of said casing to the opposite end of the same. A plug, B, corresponding therewith in size and shape, is fitted to or within the opening in the casing A, and is provided with a stem or spindle, C, that extends outward from the center of the largest end of said plug, and in a line with the same. Fitted to and secured upon the largest end of the casing is a head, D, which has attached to and extending outward from its center a sleeve, E, provided with a central opening that corresponds with and receives the spindle C, and furnishes a bearing for the same. The opposite end of said casing is closed by a second head, F, to the center of which is attached the steam-pipe G. From its smallest end to a point near its largest end the plug B is hollow, and its interior communicates with the pipe G, while from its longitudinal center extend radially outward two rectangular openings, $b$ and $b^1$, which are arranged with their longest axes in a line with said plug, and relatively have angles of about forty-five degrees. At opposite points upon the periphery of said plug are provided semicircular depressions $b^2$ and $b^3$, which correspond in length to the openings $b$ and $b^1$, and have about two and a half times their width. Passing radially outward from nearly opposite sides of the central opening of the casing, and in a line, longitudinally, with the openings $b$ and $b^1$ within the plug, are two corresponding passages or ports, $a$ and $a^1$, which turn upward in a short curve, and extend in parallel lines through a suitable enlargement, A', to the cylinder H, and communicate with opposite ends of the same in the usual manner. Immediately below said openings $a$ and $a^1$ are two corresponding openings, $a^2$ and $a^3$, which extend outward, downward, and inward in curves, and, uniting together, form within a second enlargement, A'', of said casing a pipe the capacity of which is about equal to the united areas of said ports. As thus constructed the ports or openings within the casing and plug are relatively arranged, so that when the port $b$ is caused to coincide with the corresponding port $a$ and to admit steam through said plug into one end of the cylinder, the opposite port $b^3$ shall cover the open ends of the ports $a^1$ and $a^3$ and furnish a free communication through the same between the opposite end of said cylinder and the open air. By rotating said plug until the ports $a^1$ and $b^1$ coincide, steam will be admitted through the same to the opposite end of said cylinder, while such steam as was before admitted through the ports $a$ and $b$ is permitted to escape through said port $a$ and the exhaust-port $b^2$, so that by giving to said plug an alternate semi-rotary movement in opposite directions the operations of filling and discharging opposite ends of the cylinder with steam will go on in the usual manner. By the admission of steam at or through the end of the plug its pressure will have a tendency to decrease the pressure of said plug upon its seat, and, consequently, diminish the wear and the power required to operate the same. As, however, the pressure of steam, if excessive, might remove the valve entirely from its seat, or, when no pressure of steam was had, said valve might become too firmly wedged into the same, it has been found necessary to provide the following described devices for controlling the relative positions of said valve and the casing. Secured to and extending radially outward from opposite sides of the sleeve E are two lugs, which together form a head, E', that receives and contains the ends of two bolts, I, which bolts extend outward in parallel lines and in a line with the spindle C, and are each provided at and within their outer ends with a neck considerably less in size than the body of the same, the inner end of said neck terminating in a right-angle shoulder, $i$, while its outer end is threaded and provided with a corresponding nut, I'. A second head, K, corresponding in exterior form and size to the head E', is provided at its ends with suitable openings so as to enable it to be placed over and move longitudinally upon the necks upon the ends of the bolts I, and has at its center a step, $k$, which corresponds in position with and bears against the outer end of the spindle C, so that, by adjusting said head K inward by means of said nuts I', the plug will be held within its casing and caused to bear upon its seat with any desired amount of pressure. An adjustable collar, L, fitted upon and secured to the spindle C, immediately outside of the head E', and bearing upon the same, prevents the plug from being pressed too hard upon its seat, and in connection with said head and its adjusting devices enables the desired longitudinal position of said plug to be readily secured and maintained. An arm, M, secured upon the spindle C, between the collar L and the head K, completes the device, and furnishes a means for connecting the valve with and operating it by the usual eccentric.

It will be seen that by the employment of two exhaust-ports and the relative arrangement of the same and the inlet-ports the openings within the casing are made to counterbalance each other, so as to secure a uniform wear of the seat or bearing for the plug, by which means a large increase in the durability of said casing is effected. A further and greater advantage is obtained by the admission of steam through the small end of the plug, as thereby the pressure of said steam is made to relieve the friction of said valve or plug upon its seat instead, as heretofore, of increasing the same, leaving to the mechanical devices described the office of so adjusting the pressure of said valve upon its seat as to secure a tight joint without unnecessary wear and loss of power by friction.

Having thus fully set forth the nature and merits of my invention, what I claim as new is—

1. The relative arrangement within the plug and casing of the ports $a$, $a^1$, $a^2$, $a^3$, $b$, $b^1$, $b^2$, and $b^3$, substantially as and for the purpose shown.

2. The heads E' and K, the bolts I provided with the nuts I', the step $k$, and the collar L, in combination with each other, the spindle C, and the sleeve E, substantially as and for the purpose set forth.

In testimony that I claim the foregoing I have hereunto set my hand this 12th day of July, 1871.

JOHN F. SWEET.

Witnesses:
R. C. ROCK,
P. C. GARRETT.